United States Patent [19]

Kimura et al.

[11] Patent Number: 4,620,900
[45] Date of Patent: Nov. 4, 1986

[54] THERMOPERVAPORATION APPARATUS

[75] Inventors: Shoji Kimura, Tokyo; Shunichi Shimatani; Atsuo Yoshimura, both of Osaka, all of Japan

[73] Assignee: Nitto Electric Industrial Company Ltd., Japan

[21] Appl. No.: 678,956

[22] Filed: Dec. 6, 1984

[30] Foreign Application Priority Data

Dec. 13, 1983 [JP] Japan .................................. 58-234764

[51] Int. Cl.$^4$ .......................... B01D 3/00; B01D 13/00
[52] U.S. Cl. ..................................... 202/172; 202/187; 202/202; 202/267 R; 159/DIG. 27; 159/DIG. 28; 203/86; 210/500.27
[58] Field of Search ....................... 203/10, 11, 99, 86, 203/89; 202/182, 152, 81, 82, 236, 172, 173, 267, 202, 185.1, 163, 187; 159/DIG. 27, DIG. 28; 210/500.2

[56] References Cited

U.S. PATENT DOCUMENTS

| | | | |
|---|---|---|---|
| 3,060,119 | 10/1962 | Carpenter | 159/DIG. 27 |
| 3,266,223 | 8/1966 | Dresser et al. | 159/DIG. 27 |
| 3,385,769 | 5/1968 | Brose | 159/DIG. 27 |
| 3,878,054 | 4/1975 | Rodgers | 159/DIG. 27 |
| 4,265,713 | 5/1981 | Cheng | 159/DIG. 27 |
| 4,280,909 | 6/1981 | Deutsch | 210/500.2 |
| 4,302,270 | 11/1981 | Nicolet | 210/500.2 |
| 4,347,139 | 8/1982 | Hayashi | 210/500.2 |
| 4,419,242 | 12/1983 | Cheng | 159/DIG. 27 |

Primary Examiner—Wilbur Bascomb
Attorney, Agent, or Firm—Sughrue, Mion, Zinn, Macpeak, and Seas

[57] ABSTRACT

A thermopervaporation apparatus comprising a microporous membrane which is impervious to liquids while readily allowing the vapor to pass therethrough, the passage of a hot feed solution situated on one side of said microporous membrane, a porous spacer disposed on at least part of the other side of said microporous membrane, and a heat-transmission wall disposed on said spacer, in such a manner that the vapor of the component to be separated from the feed solution permeates said membrane, diffuses to said heat-transmission wall through said spacer and is cooled on said heat-transmission wall to form a condensate which is withdrawn through said spacer, thereby improving a yield of the condensate.

14 Claims, 11 Drawing Figures

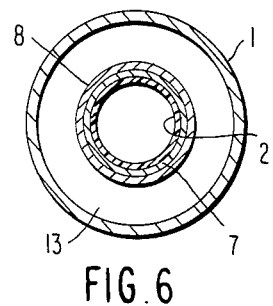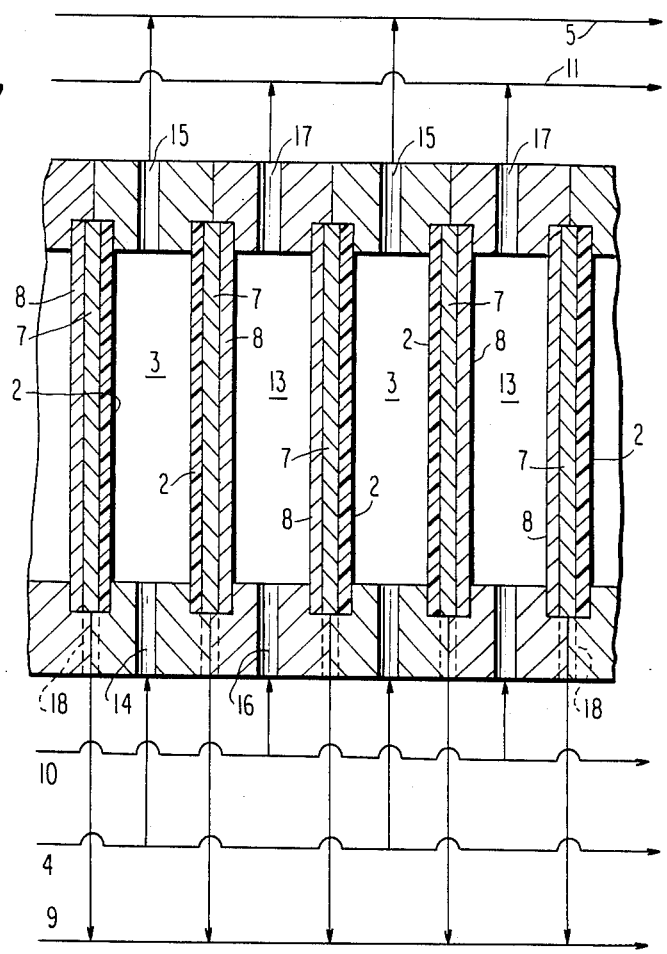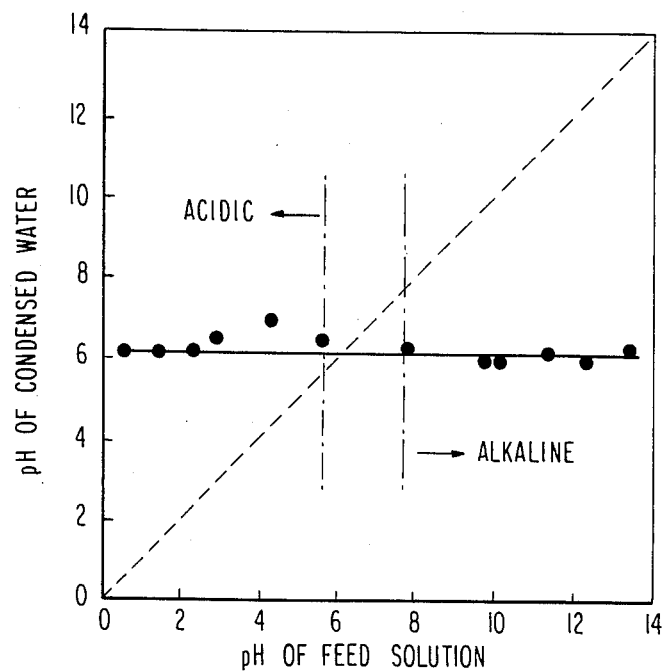

THERMOPERVAPORATION APPARATUS

BACKGROUND OF THE INVENTION

1. Field of the Invention:

This invention relates to a thermopervaporation apparatus. More particularly, it relates to a thermopervaporation apparatus having a porous spacer positioned between a microporous membrane and a heattransmission wall to minimize the space therebetween thereby improving the yield of the condensate.

2. Description of the Prior Art:

As a method for separating water from an aqueous solution, there has been a thermopervaporation method wherein a feed solution such as brine is passed through one side of a microporous membrane (which is impervious to liquids while readily allowing the vapor to pass therethrough) and the vapor of the component to be separated from the feed solution is condensed on a cold wall at the other side of the membrane. A variety of apparatus for performing such a sparation method have been proposed. For example, Japanese Patent Publication No. 49-45461 (45461/1974) discloses a multistage thermopervaporation apparatus for separating a component from a solution by circulating the hot feed liquid to be distilled and a cooling liquid at respectively opposite sides of a gaseous region situated between the abovementioned microporous membrane which is permeable to the vapor of the component to be separated and the cold wall on which that vapor is to condense, resulting in a pure water from brine.

Generally, such a thermopervaporation apparatus will be able to attain a high condensation rate for the vapor thereby attaining a high yield per hour of the condensate, and will be minimized if the space (i.e., a gaseous region) between the membrane and the cold wall is made small. However, the membrane is not rigid and tends to bend, so that it often comes into contact with the cold wall. The portion of the membrane which is in contact with the cold wall prevents not only the vapor from permeating the membrane but also the condensate from passing between the membrane and the cold wall, thereby reducing the yield of the condensate. Thus, a conventional thermopervaporation apparatus is constructed so that a large space between the microporous membrane and the cold wall is maintained to avoid contact therebetween. This accordingly results in an unavoidable reduction of the yield of the condensate.

SUMMARY OF THE INVENTION

The apparatus of this invention which overcomes the above-discussed disadvantages and other numerous drawbacks and deficiencies of the prior art, comprises a microporous membrane which is impervious to liquids while readily allowing the vapor to pass therethrough, the passage of a hot feed solution situated on one side of said microporous membrane, a porous spacer disposed on at least part of the other side of said microporous membrane, and a heat-transmission wall disposed on said spacer, in such a manner that the vapor of the component to be separated from the feed solution permeates said membrane, diffuses to said heat-transmission wall through said spacer and is cooled on said heat-transmission wall to form a condensate which is withdrawn through the said spacer.

The microporous membrane has, in a preferred embodiment, pores of a diameter in the range of 0.05 to 50 μm.

The microporous membrane has, in a preferred embodiment, pores occupying the portion of 20% or more of the total volume thereof.

The microporous membrane has, in a preferred embodiment, a thickness in the range of 1 to 500 μm.

The microporous membrane is made of a fluorocarbon resin, a silicone resin, polyethylene or polypropylene. The fluorocarbon resin is at least one selected from the groups consisting of polytetrafluoroethylene, vinylidene fluoride, and ethylene-tetrafluoroethylene copolymer.

The porous spacer is made of one selected from the groups consisting of woven or non-woven cloths made of natural and/or synthetic fibers; woven or non-woven cloths impregnated with melamine-formaldehyde resin or epoxy resins; woven or non-woven cloths made of carbon fibers; sponge-like porous sheets; and metal nets. The synthetic fibers are one selected from the groups consisting of polyethylene, polyesters, and polyamides.

The woven or non-woven cloths are, in a preferred embodiment, in the range of 10 to 1000 mesh.

The porous spacer has, in a preferred embodiment, a thickness in the range of 0.1 to 5 mm.

Thus, the invention described herein makes possible the objects of (1) providing a thermopervaporation apparatus attaining a high yield of the condensate; (2) providing a thermopervaporation apparatus wherein a microporous membrane is disposed close to a heat-transmission wall such that as soon as the vapor of the component to be separated from a feed solution passes through the membrane, it is cooled on the heat-transmission wall and condenses; (3) providing a thermopervaporation apparatus wherein the resulting condensate can smoothly pass through the space between the membrane and the heat-transmission wall and can be withdrawn therefrom.

BRIEF DESCRIPTION OF THE DRAWINGS

This invention may be better understood and its numerous objects and advantages will become apparent to those skilled in the art by reference to the accompanying drawings as follows:

FIG. 6 is a sectional view of the thermopervaporation apparatus at line IV—IV in FIG. 5.

FIG. 7 is a vertical sectional view of another thermopervaporation apparatus according to this invention.

FIG. 8 is a graph showing the relationship between the pH values of the feed solution and the pH values of the condensate in a treatment of acidic and alkaline solutions.

DESCRIPTION OF THE PREFERRED EMBODIMENTS

Figure 1:
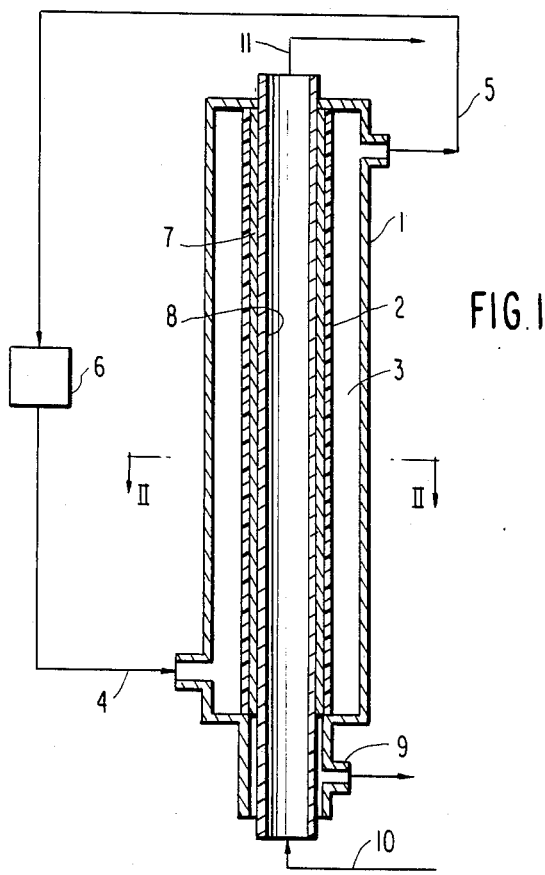
FIG. 1 is a vertical sectional view of a thermopervaporation apparatus according to this invention.
Figure 2:
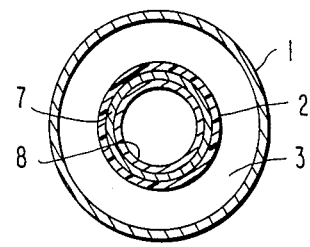
FIG. 2 is a sectional view of the thermopervaporation apparatus at line II—II in FIG. 1.

FIGS. 1 and 2 show a thermopervaporation apparatus of this invention, wherein an inner tube 2 made of a microporous membrane is coaxially disposed within an outer tube 1 to form the passage 3 of a hot feed solution therebetween. The microporous membrane constituting the inner tube 2 should not have an affinity for the hot feed solution (i.e., it should be hydrophobic if the feed solution is an aqueous solution) and should be impervious to the feed solution while readily allowing for the passage of the vapor therethrough. The microporous membrane has pores of a size ranging from 0.05 to 50 μm, preferably 0.1 to 10 μm, the pores occupying the portion of 20% or more, preferably 50%, of the total volume of the membrane. The thickness of the microporous membrane is in the range of 1 to 500 μm, preferably 5 to 50 μm, but it is not limited thereto. When the feed solution is an aqueous solution, materials useful for the microporous membrane are fluorocarbon resins such as polytetrafluoroethylene, vinylidene fluoride, ethylene-tetrafluoroethylene copolymer, etc.; polypropylene (for example, CELLGARD which is obtained from CELANESE PLASTICS COMPANY and has the pores occupying the portion of 35% of the total volume thereof); and polyethylene, due to the heat-resistance and hydrophobia thereof. Microporous membranes made of hydrophilic materials such as polysulphone, cellulose, etc. are coated with hudrophobic materials such as fluorocarbon resins, silicone resins, etc..

Conduits 4 and 5 are connected to the passage 3 and, as desired, a heater 6. The feed solution is heated by the heater 6 up to a given temperature and flows from conduit 4 into the passage 3 and is drawn from the conduit 5. Fresh feed is supplied to this system as desired.

A spacer 7 is disposed on the inner side of the above-mentioned microporous membrane tube 2. On the inner side of the spacer 7, a heat-transmission wall 8 is disposed. The spacer 7 should be porous so that the vapor of the component to be separated from the feed solution permeates the membrane tube 2 and reaches the heat-transmission wall 8. The vapor is cooled on the heat-transmission wall 8, resulting in a condensate which is withdrawn through the spacer 7. Thus, the spacer 7 should also be liquid-permeable and heat-conductive, examples of which are woven or non-woven cloths ranging from 10 to 1000 mesh made of natural and/or synthetic fibers such as polyethylene, polyesters, polyamides, etc.; porous sheets which are obtainable by impregnating the above-mentioned cloths with melamine-formaldehyde resin, epoxy resins or the like; woven or non-woven cloths made of carbon fibers; sponge-like porous sheets; metal nets, etc.. The thickness of the spacer 7 is in the range from 0.1 to 5 mm, preferably 0.2 to 3 mm, but it is not limited thereto. When the thickness is too great, the condensation effectiveness will be reduced. A conduit 9 of the condensate is connected to the lower portion of the spacer 7, by which the condensate is led from the upper portion to the lower portion and withdrawn through the conduit 9 from this system. Any spacers which direct the condensate to specific directions can be used.

Figure 3:
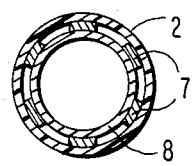
FIG. 3 is a sectional view of another thermopervaporation apparatus according to this invention.
Figure 4:
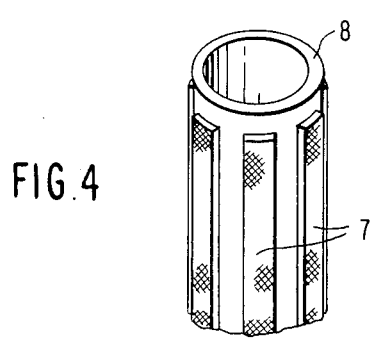
FIG. 4 is a partial perspective view of spacers disposed on the microporous membrane in FIG. 3.

The spacer 7 is disposed on the membrane tube 2 in such a manner that it can come into contact with at least one part of the inner side of the membrane tube 2, as shown in FIGS. 3 and 4. It can be disposed on the membrane tube 7 near the conduit 9 for withdrawing the condensate. Thus, the condensate can be smoothly withdrawn through the spacer 7 even though part of the membrane tube 2 comes into contact with the heat-transmission wall 8.

The spacer 7 can be attached to the membrane tube 2 or the heat-transmission wall 8, in advance, unless such adhesion of the spacer thereto prevents the vapor from permeating the membrane tube 2 and diffusing through the spacer 7 to the heat-transmission wall 8.

The heat-transmission wall 8 is a thin tube made of materials having an excellent heat-conductivity, such as metals. To this heat-transmission wall 8, conduits 10 and 11 are connected. A cooling medium such as cooling water is recycled within the heat-transmission tube 8 through the conduits 10 and 11.

Alternatively, a plurality of membrane tubes having a spacer on the inner said of each of the membrane tubes and a heat-transmission wall on the inner side of the spacer can be coaxially disposed within the outer tube.

Figure 5:
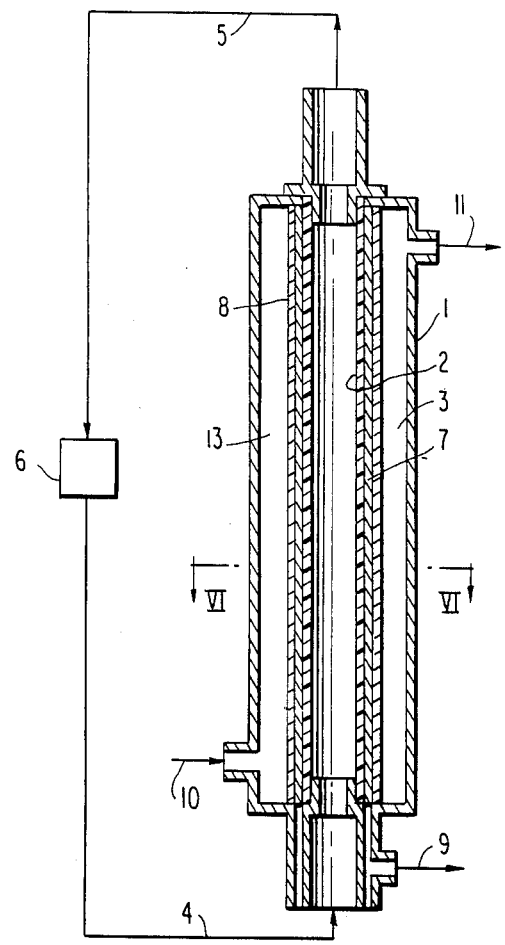
FIG. 5 is a vertical sectional view of another thermopervaporation apparatus according to this invention.

FIGS. 5 and 6 show another thermopervaporation apparatus of this invention wherein the passage 3 for the hot feed solution is situated within the membrane tube 2 which is coaxially disposed in the outer tube 1. The spacer 7 is disposed on the outer side of the membrane tube 2. The heat-transmission tube 8 is disposed on the outer side of the spacer 7 to form a passage 13 for a cooling medium such as cooling water therebetween. In the same manner as in the above-mentioned embodiment, the conduits 4 and 5 for the feed solution are connected to the passage 3, and the conduits 10 and 11 for the cooling medium are connected to the passage 13. The conduit 9 for withdrawing the condensate is connected to the lower portion of the spacer 7.

FIG. 7 shows another thermopervaporation apparatus of this invention wherein a plurality of microporous membrane walls 2 are disposed in parallel with each other to form the passages 3 of the feed solution therebetween and the porous spacer 7 is disposed on the outer side of each of the membrane walls 2. On the outer side of each of the spacers 7, the heat-transmission wall 8 is disposed to form the passages 13 of a cooling medium together with the opposite heat-transmission wall. The feed solution is introduced into the passage 3 from conduit 4 via inlet 14 and discharged from conduit 5 via outlet 15. The cooling medium is introduced into the passage 13 from conduit 10 via inlet 16 and discharged from conduit 11 via outlet 17. The spacer 7 is connected to conduit 9 by outlet 18.

According to this invention, a hot feed solution is fed to the passage 3 and the vapor of the feed solution permeates the membrane tube or wall 2 and diffuses through the spacer 7 to the heat-transmission wall 8 within which a cold medium is circulated. The vapor is cooled on the heat-transmission wall 8, resulting in a condensate, which is then directed to the conduit 9 by the spacer 7 and withdrawn from this system. As such a separation treatment of the feed solution is repeated, the residual feed solution can be concentrated to the desired extent.

The apparatus of this invention is designed such that a microporous membrane and a heat-transmission wall are disposed through a thin spacer in parallel with each other to maintain an extremely small space therebetween and thus the spacer can be cooled by the heat-transmission wall. Therefore, as soon as the vapor permeates the membrane, it is cooled by the spacer and the heat-transmission wall to condense thereby attaining a high condensation rate. Moreover, since the spacer which directs the condensate to a given direction is disposed between the membrane wall and the heat-transmission wall, the condensate can smoothly flow down to the outlet. Thus, the thermopervaporation apparatus of this invention can attain a high condensation rate and a high condensation yield.

Using the thermopervaporation apparatus of this invention, for example, pure water can be produced from a saline solution; useful components used in food or medical industries can be separated and/or concentrated; waste liquid such as pectin solution, gelatine solution, starch solution, acidic water, alkaline water, chromatic solution, liquids from a boiler and/or a pulp mill, etc., can be treated.

EXAMPLE 1

The apparatus shown in FIG. 1 was used which comprises a heat-transmission tube of stainless steel disposed coaxially within an outer tube; a porous spacer made of a porous polyamide woven cloth (50 mesh) having a thickness of 0.5 mm which is disposed on the outer side of the heat-transmission tube; and a microporous membrane tube of polytetrafluorethylene having a pore diameter of 0.6 μm on the average, a thickness of 70 μm and the pore portion of 80% of the total volume thereof which is disposed on the outer side of the spacer, resulting in an effective membrane area of 240 cm².

A cooling water having a temperature of 10° C. was circulated within the heat-transmission tube while a saline solution at 60° C. containing salt in a concentration of 3.5% was treated. The condensed water was obtained at a rate of 16.0 kg/m² per hour.

EXAMPLE 2

The same apparatus and the same conditions as in Example 1 were adapted except that a woven cloth (50 mesh), having a thickness of 0.5 mm, made of carbon fibers was used as a spacer. The condensed water was obtained at a rate of 17.2 kg/m² per hour.

As a reference standard, an apparatus without a spacer, having a space of 0.4 mm between a microporous membrane and a heat-transmission tube, was used for treatment of the same saline solution as in the above Examples 1 and 2. The condensed water was obtained at a rate of 2.0 kg/m² per hour.

EXAMPLE 3

The same polyamide woven cloth as in Example 1 was spot-adhered to the same microporous membrane as in Example 1. A plurality of the resulting laminations were disposed in parallel in such a manner that within each pair of parallel laminations, the porous surface of each membrane is aligned so that it faces the porous surface of its partner. A heat-transmission wall made of stainless steel was placed on each of the polyamide spacers, resulting in an apparatus having 20 stages and an effective membrane area of 0.64 m² shown in FIG. 7. The same saline solution as in Example 1 was treated in the same manner as in Example 1. The condensed water was obtained at a rate of 14.5 kg/m² per hour.

EXAMPLE 4

Acidic and alkaline solutions were treated using the same apparatus as in Example 1. The results are shown in Table 1 and FIG. 8, which indicate that sulfuric acid and sodium hydroxide, respectively, were completely separated from each of the feed acidic and alkaline solutions, resulting in pure water as a condensate at a high yield.

TABLE 1

|  | pH | | Yield Rate (kg/m²·hr) | Rejection (%) |
| --- | --- | --- | --- | --- |
|  | Feed Solution | Condensed Water | | |
| Sulfuric acid | 0.48 | 6.09 | 16.2 | 100 |
|  | 1.44 | 6.04 | 16.0 | 100 |
|  | 2.8 | 6.11 | 16.0 | 100 |
|  | 4.2 | 6.41 | 16.0 | 99.0 |
| Sodium hydroxide | 9.85 | 5.84 | 16.2 | 100 |
|  | 11.41 | 5.83 | 16.2 | 100 |
|  | 12.35 | 5.98 | 16.3 | 100 |
|  | 13.55 | 6.11 | 16.0 | 100 |

EXAMPLE 5

Figure 9:
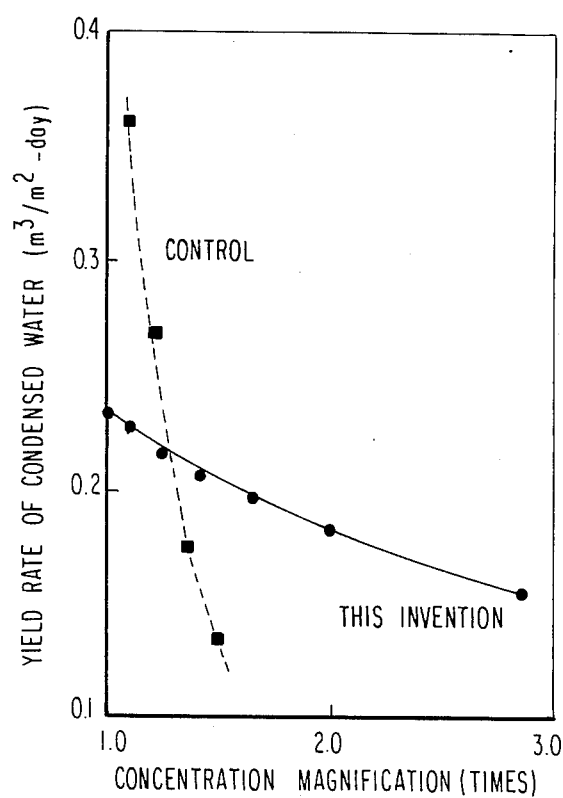
FIG. 9 is a graph showing the relationship between the degree of the concentration of the feed solution and the yield of the condensate.

Orange juice (specific gravity:12 Bx°) was concentrated using the same apparatus and the same conditions as in Example 1 except that the orange juice was maintained at a temperature of 48° C. As a reference standard, the same orange juice as mentioned above was treated at 30° C. under 50 kg/cm² by a reverse osmosis method. The results are shown in FIG. 9, which indicates that the apparatus of this invention can attain a high concentration rate and a stable condensation yield in a wide range of concentration rates.

EXAMPLE 6

A cooling water having a temperature of 20° C. was introduced into the heat-transmission tube of the same apparatus as in Example 1 while a pectin extract solution of 60° C. containing pectin of a concentration of 0.2% by weight was fed to the feed passage resulting in a concentrated solution containing pectin in a concentration of 1.35% by weight (6.7 times its original pectin concentration). The resulting condensed water contains pectin in a concentration of 20 ppm or less.

Figure 10:
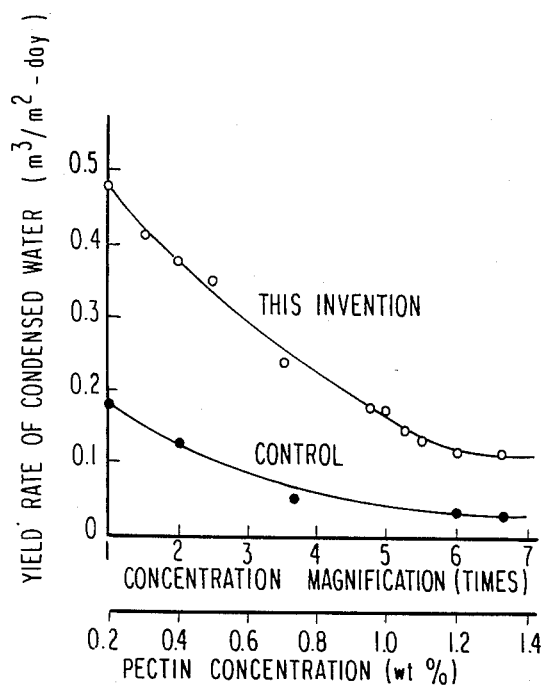
FIG. 10 is a graph showing the yield rate of the condensate from a pectin solution.

As a reference control, the same pectin extract solution as mentioned above was treated at 30° C. at a flow rate on the surface of a membrane of 2 m/sec. under 4 kg/cm² by a membrane module which is provided with a polysulfone untrafiltration membrane having a fractional molecular weight of 20,000, resulting in a concentrated solution containing pectin in a concentration of 1.36% by weight (6.8 times its original pectin concentration). The results are shown in FIG. 10, indicating that the condensed water is obtained at a high rate and the feed solution can be concentrated at a concentration magnification of 6 times or more according to this invention, while a conventional untrafiltration module produces the condensed water at an extremely low rate and cannot substantially operate as a filtration module at a concentration magnification of as low as 3 times.

EXAMPLE 7

A cooling water of 10° C. was introduced into the heat-transmission tube of the same apparatus as in Example 1 while an oyster extract (a total solid content of 3.73%, a total nitrogen content of 1800 ppm, and an electrical conductivity of 3200 μS) of 60° C., which was obtained by treating oysters at 80°-100° C., was fed into the feed passage of the apparatus. The results are shown in Table 2.

TABLE 2

| Concentration Magnification | 1 | 3 |
| --- | --- | --- |
| Total Nitrogen Content (ppm) | | |
| Concentrated liquid | 1800 | 5300 |
| Condensed water | 64.4 | 70 |
| Total Solid Content (%) | | |
| Concentrated liquid | 3.73 | 11.8 |
| Condensed water | 0.07 | 1.1 |
| Electrical Conductivity (μS) | | |
| Concentrated liquid | 3200 | 8000 |
| Condensed water | 310 | 600 |
| Yield Rate of Condensed Water ($m^3/m^2 \cdot$ day) | 0.25 | 0.20 |

EXAMPLE 8

Figure 11:
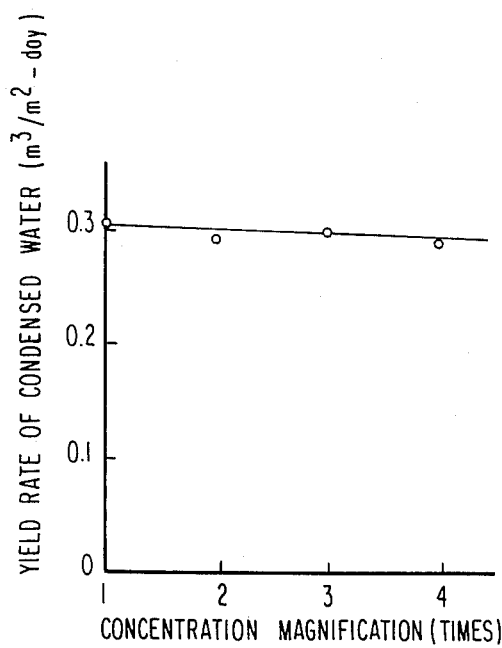
FIG. 11 is a graph showing the relationship between the concentration magnification and the yield rate of the condensed water in a treatment of a waste liquid from a pulp mill.

A cooling water of 10° C. was introduced into the heat-transmission tube of the same apparatus as in Example 1 while a black colored waste liquid containing lignin and sodium hydroxide (a solid content of 10%, a COD of 20,000 ppm, a pH value of 12.6, and an electrical conductivity of 10,000 μS) of 60° C. from a pulp mill was fed into the feed passage of the apparatus, resulting in a solution having a concentration of four times. The yield rate of the condensed water was constantly 0.3 $m^3/m^2$ per day, as shown in FIG. 11, during the concentration treatment. The resulting condensed water contains neither solid elements (a rejection of 99.99%) nor COD (a removal efficiency of 99.99%), and it had an electrical conductivity of as low as 2.3 μS. Thus, it was found that the apparatus of this invention provides a high quality condensed water from such a waste liquid.

As a reference control, a waste liquid (a total solid content of 8.3%, a COD of 35000 ppm and a pH value of 11.3) from a pulp mill was treated at 25° C. under 45 kg/cm² by a reverse osmotic membrane having a salt removal efficiency of 99%, resulting in a solution having a concentration of two times. The yield rate of the condensed water was 1.8 l/m² per hour on the average. The yield rate decreased so remarkably with the lapse of time that is decreased to one fifth of an early stage at a time when a concentration of two times was attained.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty which reside in the present invention, including all features which would be treated as equivalents thereof by those skilled in the art to which this invention pertains.

What is claimed is:

1. A thermopervaporation apparatus comprising a microporous membrane which is impervious to liquids while readily allowing vapor of a liquid to pass therethrough, means providing for flow of a hot feed solution situated on one side of said microporous membrane, a porous liquid permeable heat conductive spacer in contact with at least part of the other side of said microporous membrane, and a heat-transmission wall in contact with at least part of the other side of said spacer so that at least said part of said membrane remains spaced apart from at least said part of said heat-transmission wall, said spacer defining condensate collection means between said membrane and said wall through which condensate can flow and from which condensate can be withdrawn, whereby the vapor of a component to be separated from the feed solution can permeate through said membrane, diffuse to said heat-transmission wall through said spacer and be cooled on said heat-transmission wall to form a condensate which can be withdrawn through said spacer.

2. A thermopervaporation apparatus according to claim 1, wherein said microporous membrane has pores of a diameter in the range of 0.05 to 50 μm.

3. A thermopervaporation apparatus according to claim 1, wherein said microporous membrane has pores occupying the portion of 20% or more of the total volume thereof.

4. A thermopervaporation apparatus according to claim 1, wherein said microporous membrane has a thickness in the range of 1 to 500 μm.

5. A thermopervaporation apparatus according to claim 1, wherein said microporous membrane is made of a fluorocarbon resin, a silicone resin, polyethylene or polypropylene.

6. A thermopervaporation apparatus according to claim 5, wherein said microporous membrane is made of a fluorocarbon resin selected from the group consisting of polytetrafluoroethylene, vinylidene fluoride, and ethylene-tetrafluoroethylene copolymer.

7. A thermopervaporation apparatus according to claim 1, wherein said porous spacer is made of a material selected from the group consisting of woven cloth made of at least one of natural and synthetic fibers; non-woven cloth made of at least one of natural and synthetic fibers; woven cloth made of at least one of natural and synthetic fibers impregnated with melamine-formaldehyde resin or epoxy resins; non-woven cloth made of at least one of natural and synthetic fibers impregnated with melamine-formaldehyde resin or epoxy resins; woven cloth made of carbon fiber; non-woven cloth made of carbon fiber; sponge-like porous sheets and metal nets.

8. A thermopervaporation apparatus according to claim 11, wherein said porous spacer is made of synthetic fibers selected from the group consisting of polyethylene, polyesters, and polyamides.

9. A thermopervaporation apparatus according to claim 7, wherein said woven or non-woven cloths are in the range of 10 to 1000 mesh.

10. A thermopervaporation apparatus according to claim 7, wherein said porous spacer has a thickness in the range of 0.1 to 5 mm.

11. A thermopervaporation apparatus according to claim 1, wherein said means providing for flow of a hot feed solution comprises an outer tube and said microporous membrane as an inter tube is coaxially disposed within said outer tube, thereby defining said flow means, said porous spacer is in contact with at least part of the inner side of said membrane and at least part of said heat-transmission tube is in contact with the other side of said porous spacer, whereby the inner wall of said heat-transmission tube defines a path for a cooling medium.

12. A thermopervaporation apparatus according to claim 1, wherein said microporous membrane is in a tubular shape, defining said means providing for flow of a hot feed solution within said membrane, said spacer is in contact with at least part of the outer side of said membrane and the other side of said porous spacer is in contact with at least part of a heat-transmission tube coaxially aligned with said membrane tube, said membrane tube and heat-transmission tube being coaxially disposed within an outer tube, thereby defining a path for a cooling medium between said heat-transmission tube and said outer tube.

13. A thermopervaporation apparatus according to claim 1, comprising a plurality of pairs of microporous membrane walls disposed in parallel with each other, to form a means providing for flow of a hot feeding solution between respective members of each pair, a porous spacer in contact with at least a part of the side of each of said membrane walls not defining said flow providing means, and each of said porous spacers being in contact with at least a part of a heat-transmission wall in parallel relationship with said membrane walls, whereby a path for a cooling medium is defined between opposite heat-transmission walls.

14. A thermopervaporation apparatus according to claim 1 wherein said flow means includes an inlet and an outlet and said condensate collection means includes an outlet.

* * * * *